United States Patent
Barnett

(10) Patent No.: US 7,966,698 B2
(45) Date of Patent: Jun. 28, 2011

(54) MODULAR HINGE FOR HANDHELD ELECTRONIC DEVICES

(75) Inventor: Ricky William Barnett, St. Albans (GB)

(73) Assignee: Nokia Corporation, Espoo (FI)

(*) Notice: Subject to any disclaimer, the term of this patent is extended or adjusted under 35 U.S.C. 154(b) by 967 days.

(21) Appl. No.: 10/584,001

(22) PCT Filed: Dec. 21, 2004

(86) PCT No.: PCT/IB2004/004379
§ 371 (c)(1),
(2), (4) Date: Nov. 29, 2006

(87) PCT Pub. No.: WO2005/062701
PCT Pub. Date: Jul. 14, 2005

(65) Prior Publication Data
US 2007/0107163 A1    May 17, 2007

(30) Foreign Application Priority Data
Dec. 23, 2003 (GB) .................................. 0329858.5

(51) Int. Cl.
*E05D 3/10* (2006.01)
(52) U.S. Cl. ................. 16/367; 16/340; 16/366
(58) Field of Classification Search ............ 16/337–339, 16/342, 330, 303, 374, 376, 377, 340, 368, 16/369; 361/679.06, 679.07, 679.11, 679.12, 361/679.28; 455/90.3, 575.1, 575.3, 575.8; 379/433.12, 433.13; 348/373, 333.01, 333.06, 348/794; 248/919, 920, 921–923
See application file for complete search history.

(56) References Cited

U.S. PATENT DOCUMENTS

| | | | | |
|---|---|---|---|---|
| 4,825,395 A * | 4/1989 | Kinser et al. | ............. | 361/679.09 |
| 5,566,048 A * | 10/1996 | Esterberg et al. | ........ | 361/679.27 |
| 5,812,368 A * | 9/1998 | Chen et al. | ............. | 361/679.06 |
| 5,845,366 A | 12/1998 | Kuroda | | |
| 5,970,580 A | 10/1999 | Katoh | | |
| 5,982,429 A * | 11/1999 | Kamamoto et al. | ..... | 348/333.06 |
| 6,018,847 A * | 2/2000 | Lu | .................. | 16/337 |
| 6,427,288 B1 * | 8/2002 | Saito | ............... | 16/361 |
| 6,437,973 B1 | 8/2002 | Helot et al. | | |
| 6,900,981 B2 * | 5/2005 | Kuivas et al. | ............ | 361/679.06 |
| 7,055,218 B2 * | 6/2006 | Lu et al. | .......................... | 16/367 |
| 7,155,781 B2 * | 1/2007 | Yamada et al. | ................. | 16/367 |
| 7,448,891 B2 * | 11/2008 | Ahn | .............................. | 439/165 |
| 2005/0091796 A1 * | 5/2005 | Lu et al. | ......................... | 16/337 |

FOREIGN PATENT DOCUMENTS

EP    1 353 488 A2    10/2003

(Continued)

OTHER PUBLICATIONS

Great Britain Search Report, GB0329858.5, dated Sep. 20, 2004.

(Continued)

*Primary Examiner* — Chuck Y. Mah
(74) *Attorney, Agent, or Firm* — Alston & Bird LLP

(57) ABSTRACT

A modular hinge for mechanically connecting first and second parts of a handheld electronic device, said modular hinge comprising at least two hinge elements, each hinge element comprising an arm and a boss with a through hole for receiving wiring for electrically connecting the first and second parts, said arm being rotatably mounted on said boss, and wherein the hinge elements are mounted on a bracket with said through holes in alignment.

8 Claims, 9 Drawing Sheets

FOREIGN PATENT DOCUMENTS

JP        2000297574 A  * 10/2000

OTHER PUBLICATIONS

International Search Report, PCT/IB2004/004379, dated Jun. 23, 2005.

European Search Report dated Jul. 19, 2007, 4 pp.
EP Examiner's Report for EP Appl. No. 04806538.7, dated Jul. 13, 2009.
Manual, *Fischer Technik Master*, Gesamtkatalog 96/97, NEU, pp. 1-5.

* cited by examiner

MODULAR HINGE FOR HANDHELD ELECTRONIC DEVICES

FIELD OF INVENTION

The present invention relates to a hinge for a handheld electronic device. Particularly but not exclusively, the present invention relates to a hinge for a mobile phone.

BACKGROUND OF THE INVENTION

A problem with known handheld electronic devices is providing a device which is small enough to be carried about by a user, while being large enough to incorporate essential features of the device for operation.

Another problem with known handheld electronic devices is that they have become so small that they are difficult to hold, manipulate and operate. In particular, they are difficult to both hold and operate at the same time.

Another problem with known handheld electronic devices is that of operating buttons on the device by accident while carrying the device around. The device may also be damaged while being carried around. For example, a screen of the device may be scratched or broken.

A further problem more specific to mobile phone devices is that they have become so small that in use they no longer cover the mouth and ear of the user at the same time. That is, ear-mouth coverage is poor due to the smaller size of modern devices. This can lead to poor sound quality for both caller and recipient. Furthermore, there is a reduction in the degree of privacy in that a user's mouth is not obscured by the phone while talking. Small handsets may also provide an uncomfortable grip. With small phones the user has to hold his/her arm higher in order to hold the phone to his/her ear which can be strenuous and uncomfortable.

Known mechanical solutions to the above-described problems include the implementation of a slide design, a rotational design or a flip/clamshell/fold design. These solutions allow for the handheld electronic device to be carried around in a configuration which is small in size when not in use. Furthermore, buttons/keys on the device may be covered by at least a portion of the casing when in this configuration so as to prevent accidental operation. The handheld electronic device may then by reconfigured into an operational configuration which is generally larger in size and better shaped to allow a user to both hold and operate the device.

The above-identified solutions comprise a body with at least two parts and a hinge (or other similar mechanical mechanism) therebetween whereby in use the device can be moved from a compact configuration to an expanded configuration. In the compact configuration the device is small and compact so as to be easy to carry. In the expanded configuration, the device is arranged so as to be easy to hold and operate at the same time.

Known arrangements in the field of mobile phones include a foldable clam structure, a slidable structure and more recently a rotatable two-part structure. Each of these known solutions is limited in the number of stable configurations the two parts of the device can take. In fact, the aforementioned solutions effectively only have two configurations, a closed configuration and an open configuration.

More recently still multi-axis hinges have been proposed. U.S. Pat. No. 6,549,789 discloses a handheld electronic device comprising, a housing including a first housing portion and a second housing portion, the first housing portion containing at least two user interfaces and the second user interface including at least one user interface, the two housing portions being coupled by a swivel hinge that allows the two housing portions to rotate about a first axis such as the housing fold together, and a second axis perpendicular to the first axis, allowing the housings to rotate relative to one another. The user can adapt the housing by rotating either of the two housing portions to the position associated with the desired operation mode.

A further problem with arrangements which comprise two parts with a hinge therebetween, is how to electrically connect the two parts so as to provide a compact hinge arrangement which allows relative movement of the two parts without breaking or damaging the electrical interconnection between the two parts.

Previously, the above problem has been solved by using large-shaft-axis hinges, these having been custom designed to suit particular applications. The electrical interconnections are made by winding the wires and/or flexes around the shafts on the final assembly line which is not production friendly. Furthermore, as each hinge is custom designed to suit a particular application, this approach is expensive and time consuming. Each new hinge design has to be extensively tested.

One arrangement is described in WO97/23936. WO97/23936 discloses a device comprising a base part, a pivoting part and a hinge structure comprising a first pair of hinges and a second pair of hinges, the hinge structure being used to pivotally mount the pivoting part on the base part, and electrical connection means between the base part and the pivoting part, whereby a connecting piece is provided between the first pair of hinges and the second pair of hinges, the electric connection means having been taken through the connecting piece and the connecting piece being mounted to partly pivot along with the pivoting part, the swinging angle of the connecting piece being smaller than the swinging angle of the hinge. This arrangement is bulky, custom designed, and only allows rotation around one axis.

SUMMARY OF THE INVENTION

An aim of the embodiments described hereinafter is to solve the problems outlined above.

According to the present invention there is provided a modular hinge for mechanically connecting first and second parts of a handheld electronic device, said modular hinge comprising at least two hinge elements, each hinge element comprising an arm and a boss with a through hole for receiving wiring for electrically connecting the first and second parts, said arm being rotatably mounted on said boss, and wherein the hinge elements are mounted on a bracket with said through holes in alignment.

According to another aspect of the present invention there is provided a set of such hinge elements and at least one bracket for constructing a modular hinge from selected hinge elements from the set, each hinge element comprising an arm and a boss with a through hole for receiving wiring for electrically connecting first and second parts of a handheld electronic device, said arm being rotatably mounted on said boss, and wherein the hinge elements are mountable on the bracket with said through holes in alignment.

According to another aspect of the present invention there is provided a handheld electronic device comprising a first body portion, a second body portion and a modular hinge, said modular hinge being disposed between said first and second body portions whereby said first and second body portions are rotatable around at least one axis relative to each other around, said modular hinge comprising at least two hinge elements, each hinge element comprising an arm and a boss with a through hole for receiving wiring for electrically connecting the first and second parts, said arm being rotatably mounted on said boss, and wherein the hinge elements are mounted on a bracket with said through holes in alignment.

According to another aspect of the present invention there is provided a process for manufacturing a handheld electronic device, said handheld electronic device comprising a first body portion, a second body portion and a hinge, wherein said process comprises the step of providing the hinge with wiring prior to the steps of fitting said hinge to said first and second body portions and connecting said wiring to electronic components housed within the first and second body portions.

According to another aspect of the present invention there is provided a method of making a handheld electronic device, said handheld electronic device comprising a first body portion, a second body portion and a hinge, said method comprising selecting from a set of hinge elements at least two hinge elements and mounting said selected hinge elements on a bracket to construct a modular hinge, providing the modular hinge with wiring, fitting said hinge to said first and second body portions and connecting said wiring to electronic components housed within the first and second body portions.

Embodiments of the present invention solve the above-identified problems by providing a handheld electronic device comprising two portions with a hinge mechanism therebetween. The hinge mechanism functions such that the two portions can be articulated into a plurality of different relative configurations. The hinge is a modular hinge which allows for the creation of many different single or multi-axis hinges using the same basic set of hinging elements arranged in different configurations in conjunction with purpose design metal bracketry. The concept allows for hinges to be supplied ready fitted with interconnection wiring.

The concept allows very quick design of hinges to meet a whole range of articulation requirements. Also it limits the need for extensive testing on every new hinge, as the hinge will be made of proven hinge elements. The design allows for multi-access rotation.

Another major benefit of embodiments of the present invention is that a path is provided inside the hinge mechanism to accommodate electrical connections between the two main body parts which is difficult to achieve using traditional camcorder display type hinges. Another advantage of embodiments of the present invention is their simplicity, and hence their cost. Each element of the hinge modules uses the same set of parts, with only minor differences to provide different opening angles and force profiles. Also, the hinge components could be provided by several manufacturers using their own technology thereby giving flexibility for procurement.

The invention can be implemented to enable a uniform approach to designing multiple hinges for mobile devices. In the manufacturing process, hinges can be supplied on trays, with the wires fitted, ready to be dropped into products and connected. The modular approach has the advantage that it is simpler to implement. Also, the electrical connections are provided through the interior of the rotational hinge axis/axes in the hinge devices rather than external as in prior art devices.

BRIEF DESCRIPTION OF THE DRAWINGS

For a better understanding of the present invention and to show how the same may be carried into effect, reference will now be made by way of example to the accompanying drawings in which.

DETAILED DESCRIPTION OF THE EMBODIMENTS OF THE INVENTION

Terminology used for the different mechanical movements and positions will now be described with reference to FIGS. 1 to 3.

Figure 1:
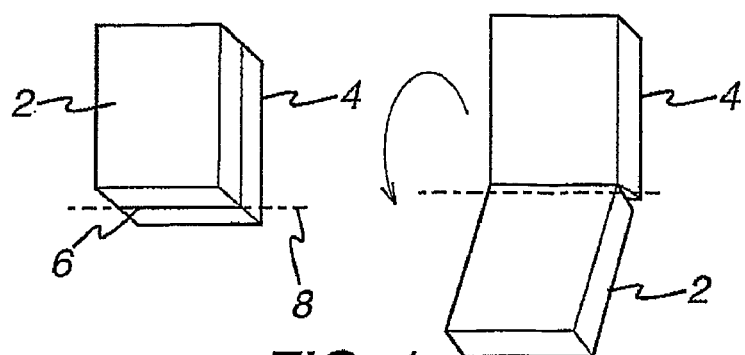
FIG. 1 is a schematic diagram illustrating a flip action of a device.

FIG. 1 shows a flip action of a product. The product comprises two portions 2, 4 with a hinge mechanism 6 therebetween. In a first or folded configuration, the two portions 2, 4 are opposed to each other. One portion of the product 2 unfolds relative to the other portion 4 via the hinge 6 into a second or open configuration, the two portions 2, 4 being disposed at an angle of 180° relative to each other or at an angle between 0 and 180° (for example, in an arrangement adapted to fit the contours of a user's face). The rotational axis 8 lies within the plane of the moving part 2 and extends in a line between the two parts 2, 4. An example of this action is the opening of a laptop computer.

Figure 2:
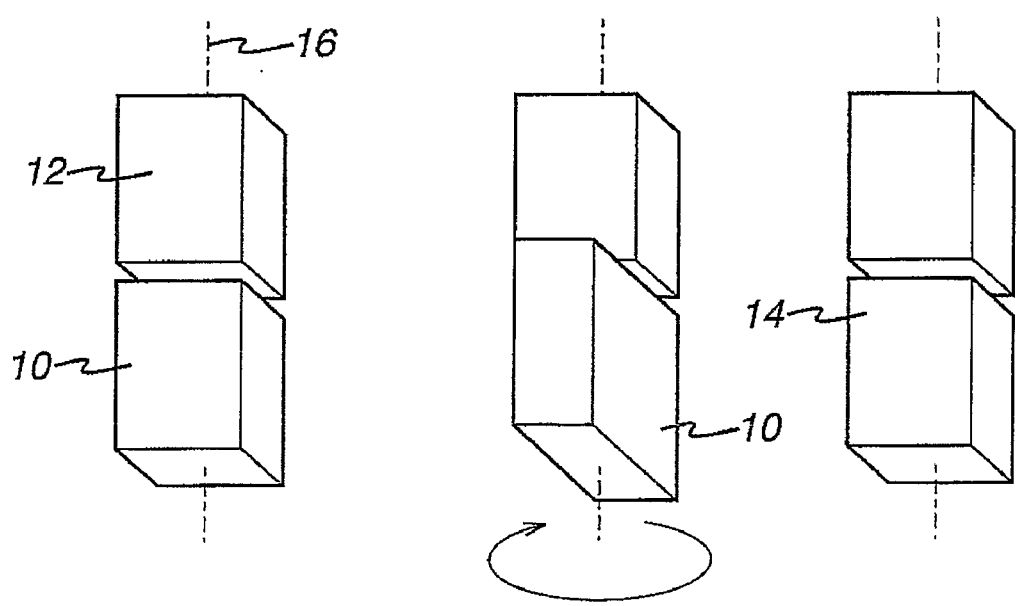
FIG. 2 is a schematic diagram showing a twist action of a device.

FIG. 2 illustrates a twist action whereby the first portion 2 rotates relative to the second adjoining portion 4 of the product to show a different face. The first configuration illustrated is similar to the second or open configuration described above in relation to FIG. 1. A first face 10 of the first portion lies in a plane, and is disposed at an angle of 180°, with respect to a first face 12 of the second portion. The first portion is rotatable relative to the second portion whereby the first face of the second portion moves out of the plane of the first face of the first portion. Rotating 180° results in a second face 14 of the second portion lying in the plane of the first face of the first portion. The axis of rotation 16 lies within the plane of the rotating portion and extends in a line substantially through the centre of the two portions. An example of this action is the rotation of a digital camera LCD when taking a self-portrait.

Figure 3:
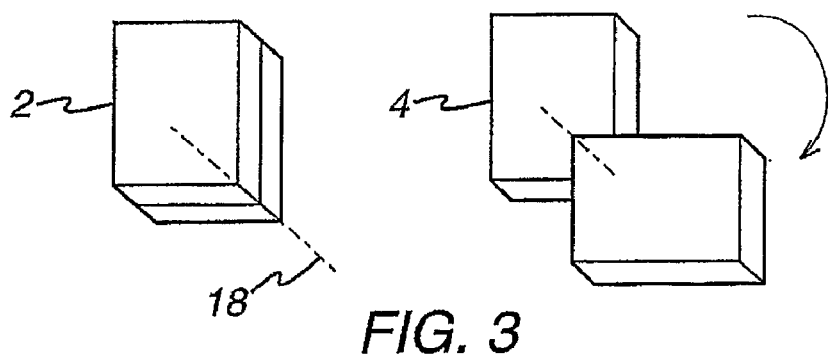
FIG. 3 is a schematic diagram showing a side winding action of a device.

FIG. 3 illustrates a side winding action. Side winding is a rotating action in which a plane of the first part does not change relative to its adjoining part. The part moves within its original plane. The axis of rotation 18 is perpendicular to the plane of the moving part. An example of this action is the rotation of the sails of a windmill.

An embodiment of a hinge element according to the present invention will now be described with reference to FIG. 4.

Figure 4:
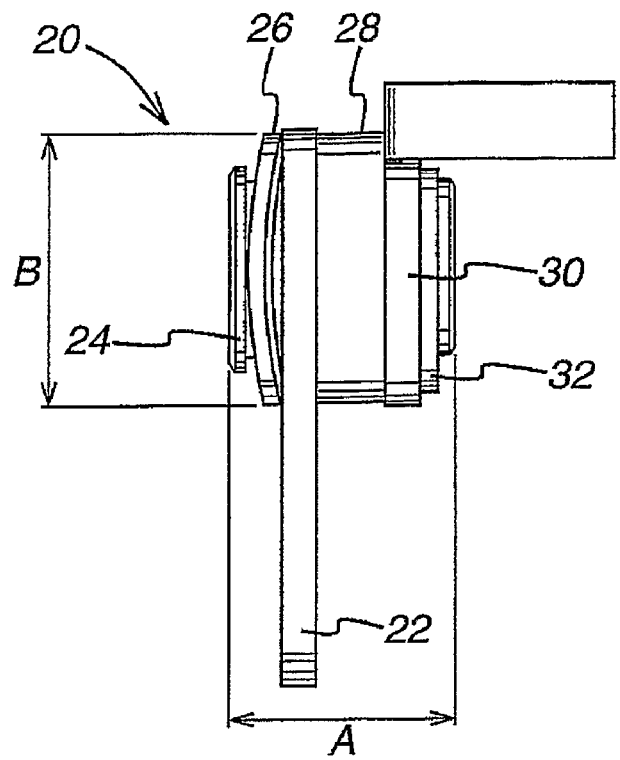
FIG. 4 shows a hinge element according to an embodiment of the present invention.

FIG. 4 illustrates a hinge element 20 for use in a hinge module. The hinge element comprises an arm 22 and a boss 24, said arm 22 being rotatably mounted on said boss 24. The boss is cylindrical and comprises an opening therethrough. The arm 22 has a circular cut out portion through which the boss extends. The circular cut out portion has an inner surface which slidably cooperates with an outer surface of the boss 24 whereby the arm 22 is supported on the boss and is rotatable relative to the boss. The hinge element further comprises an elastic member 26, in this case a spring, mounted on the boss. The spring is mounted on the outer surface of the boss. The spring serves to hold the arm on the boss and also provides an urging force against a side surface of the arm to securely hold the arm against a washer 28 which is also mounted on the outer surface of the boss at an opposite side of the arm to said spring. A bracket 30 is mounted on the outer surface of the boss at a side of the washer opposite to the arm. The bracket 30 is arranged for connection to another hinge element for forming a hinge module. A C-clip 32 is mounted on the outer surface of the boss at a side of said bracket opposite to said washer for holding the bracket (and other components which are mounted on the boss) on the outer surface of the boss.

The arm is arranged for being connectable to a first portion of a body of a hand held electronic device. The bracket is arranged to be connectable to at least one other hinge element which is connectable to a second portion of the body of the hand held device. The bracket may be a H-shaped bracket which connects four hinge elements together in a hinge module. Alternatively the bracket may be a C-shaped bracket which connects three hinge elements together in a hinge module. Alternatively still, two C-shaped brackets may be provided to connect five hinge elements together in a hinge module. The different hinge module arrangements will be discussed in more detail below.

An important feature of the present hinge concept is the re-use of the same "standard" set of hinge elements arranged in various configurations to enable rotation about one or more axes, and the ability to route electrical connections through the hinge centres (openings through the bosses).

During manufacture, the wiring (which encompasses all types of electrical connection including, for example, cable and FPC (Flexible Printed Circuit)) routing is provided as part of the hinge module when supplied to the final assembly line. This effectively reduces the complexity of assembly into the parent product. One identified challenge is the logistics involved to supply this assembly with wiring included.

The following features should be facilitated using the vendors' in-house expertise: fixed "click" positions; force profile (opening and closing); and rotation limiters.

The width of the cable hole/opening in the boss will depend on the number and thickness of wires to be used in electrically connecting the two body parts of a device. The width is preferably 2 mm or larger, more preferably 4 mm or larger. In larger/more complex devices the width of the cable hole may be 6 mm or larger and more preferably 8 mm or larger.

The width and diameter of the hinging elements (dimensions A and B) should be minimized, without affecting the width of the cable hole.

It is also desirable to reduce the thickness of the brackets and arms of the hinge modules when the strength of these elements can be maintained by embossing. The materials of the hinge modules are also to be determined by the vendor. Hinge modules will be required to meet the usual reliability and environmental standards, i.e. 100,000 cycles operation (about each axis).

A first embodiment of a hinge module according to the present invention will now be described with reference to FIGS. 5 to 8.

Figure 5:
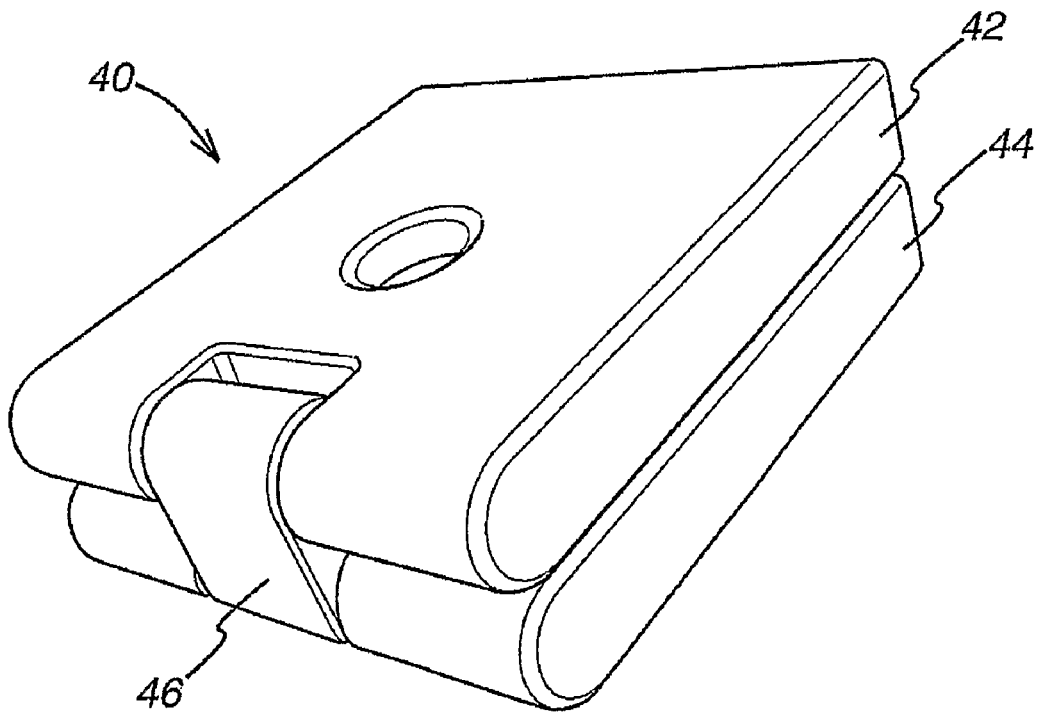
FIG. 5 shows a product according to an embodiment of the present invention.

FIG. 5 shows a first embodiment of a product according to the present invention which can undergo a flip-type motion as illustrated in FIG. 1. The illustrated embodiment can fold though a full 360°. The product 40 comprises a first body portion 42 comprising two covers, a second body portion 44 comprising two covers and a hinge module 46 connecting the first and second portions. In an alternative embodiment the body portions each comprise a single cover.

Figure 6:
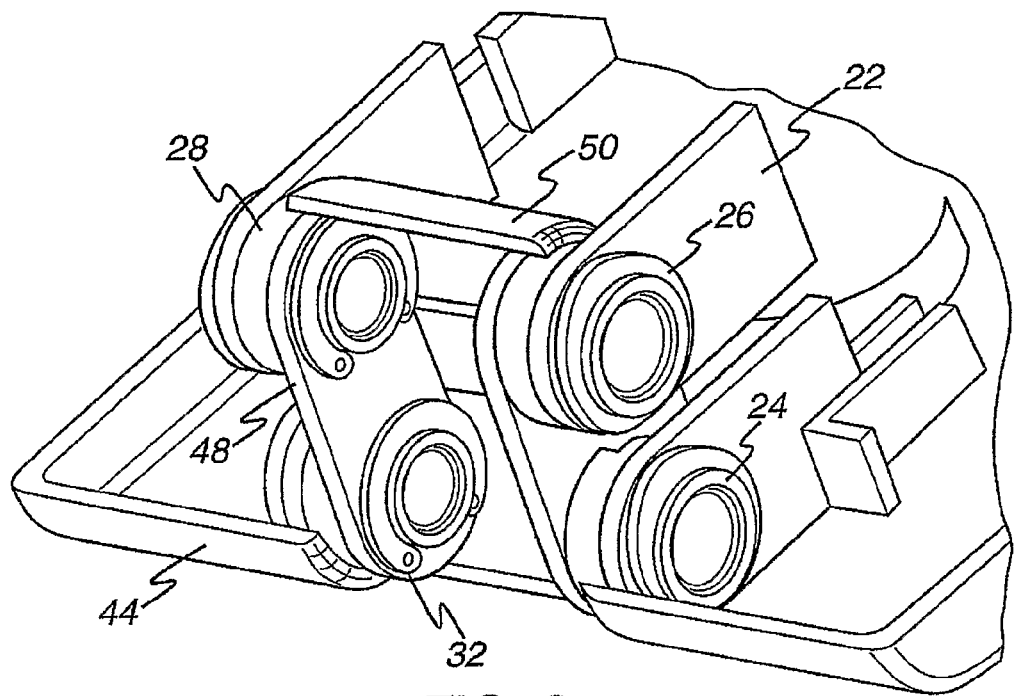
FIG. 6 shows a partial cutaway view of the embodiment shown in FIG. 5 comprising a number of hinge elements as shown in FIG. 4.

FIG. 6 shows a partial cutaway view of the embodiment shown in FIG. 5. The hinge module comprises four arms 22, four bosses 24, four c-clips 32, one H-shaped bracket 48, two covers 50, four springs 26, and four washers 28. The parts are arranged into four hinge elements as previously described and shown in FIG. 4, the four hinge elements being connected together via a H-shaped bracket. The H-shaped bracket comprises a cross-piece and four lobes, each lobe having a circular cut away portion for mounting the bracket on an outer surface of a boss. A pair of covers 50 are provided for housing the hinge assembly to prevent dust and other debris getting into the mechanism.

The hinge module should be of a size such that the cable holes should be maintained at at least 4 mm diameter (larger if preferred). The completed hinge assembly should fit into the pair of covers with a maximum 10 mm dimension of the outer surfaces (i.e. enabling a 20 mm folding product). In general, the dimensions of the assembly should be kept as small as possible and the weight as light as possible.

The hinge module has two pairs of hinge elements, each pair sharing an axis of rotation and wherein the two axes of rotation are parallel to each other. This arrangement allows the two body parts to be rotated through 360°.

Figure 7:
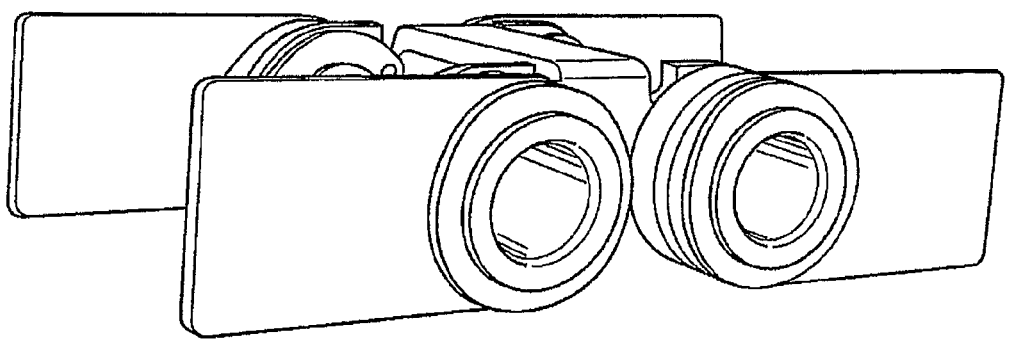
FIG. 7 shows a portion of the embodiment illustrated in FIG. 6 with two main body parts (not shown) orientated at a fixed open angle of 180°.

In the arrangement shown in FIGS. 5 and 6, the two body parts are in the closed position opposing each other. FIG. 7 shows a portion of the embodiment illustrated in FIG. 6 with the two main body parts (not shown) orientated at a fixed open angle of 180°. In this arrangement the product is completely flat.

Figure 8:
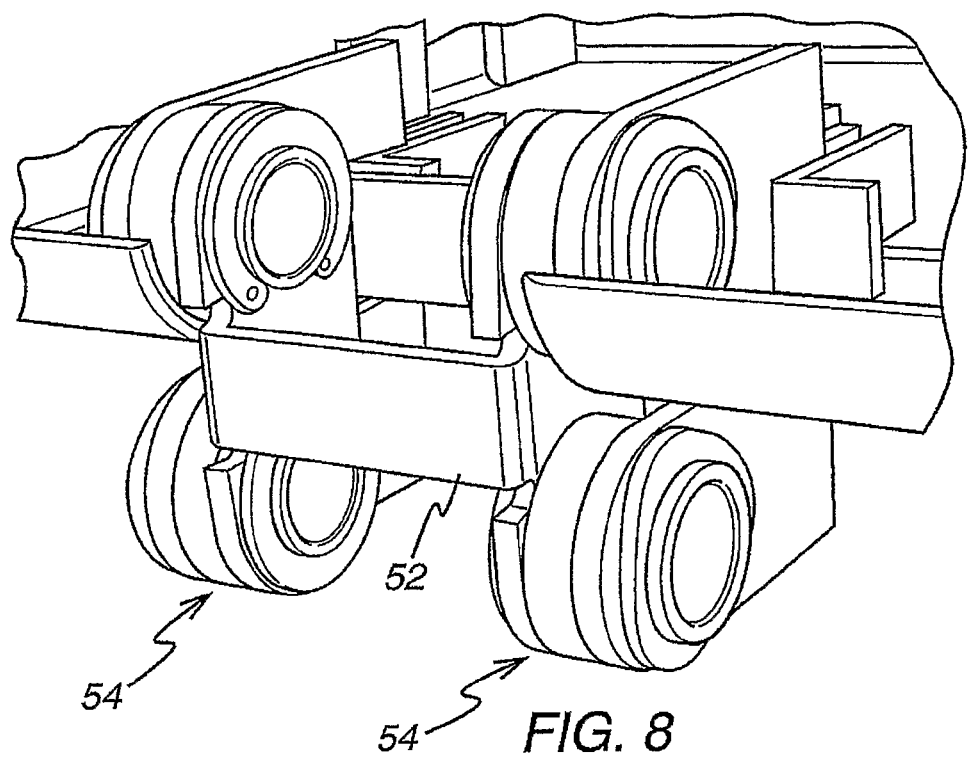
FIG. 8 illustrates a further arrangement of the embodiment shown in FIGS. 5 to 7, the product having a fixed position at an opening angle of 360°, i.e. folded back on itself.

FIG. 8 illustrates a further arrangement of the embodiment shown in FIGS. 5 to 7, the product having a fixed position at an opening angle of 360°, i.e. folded back on itself. The structure of the H-shaped bracket can be seen more clearly in this Figure with the cross-piece 52 and lobes 54 clearly visible. One axis of rotation is provided either side of the cross-piece and parallel to the cross-piece.

Figure 9:
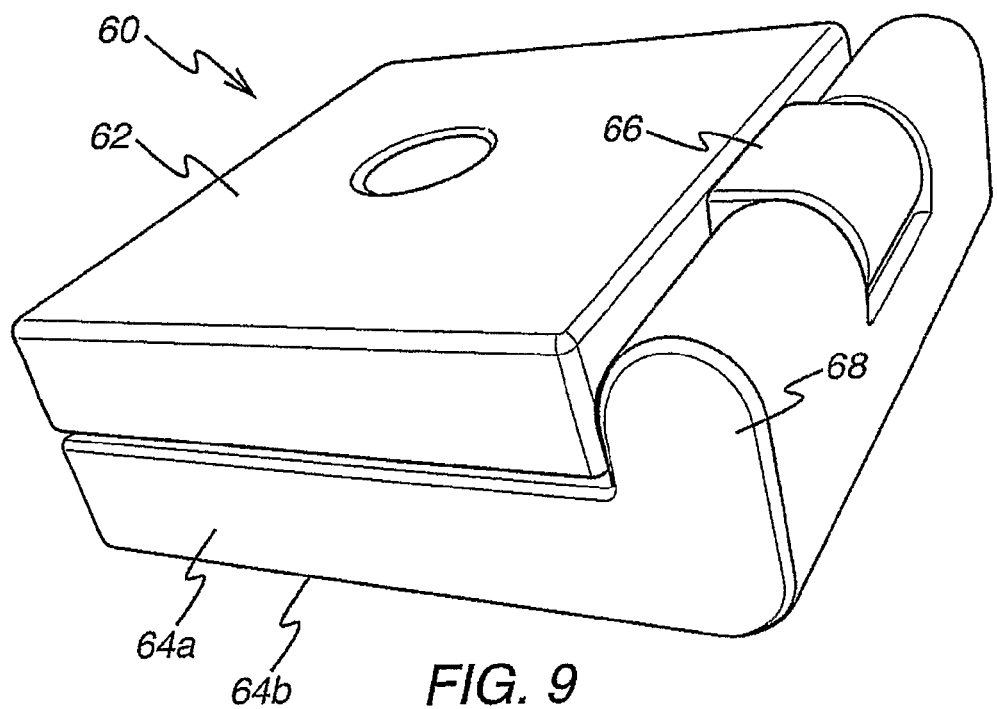
FIG. 9 shows a product according to a second embodiment of the present invention.

FIG. 9 shows a second embodiment of a product 60 according to the present invention which can undergo flip and twist motions as illustrated in FIGS. 1 and 2. The product comprises a first body portion 62 comprising two covers, a second body portion 64 comprising two L-shaped covers 64a, 64b, and a hinge module 66 connecting the first and second portions. The two L-shaped covers 64a, 64b of the second body portion form an L-shaped body portion with a portion 68 which extends perpendicular to the first body portion 62 across the width of the first body portion. The hinge module is disposed between this perpendicular portion and the first body portion. A pair of covers is provided for housing the complete hinge module to prevent dust and other debris getting into the mechanism.

Figure 10:
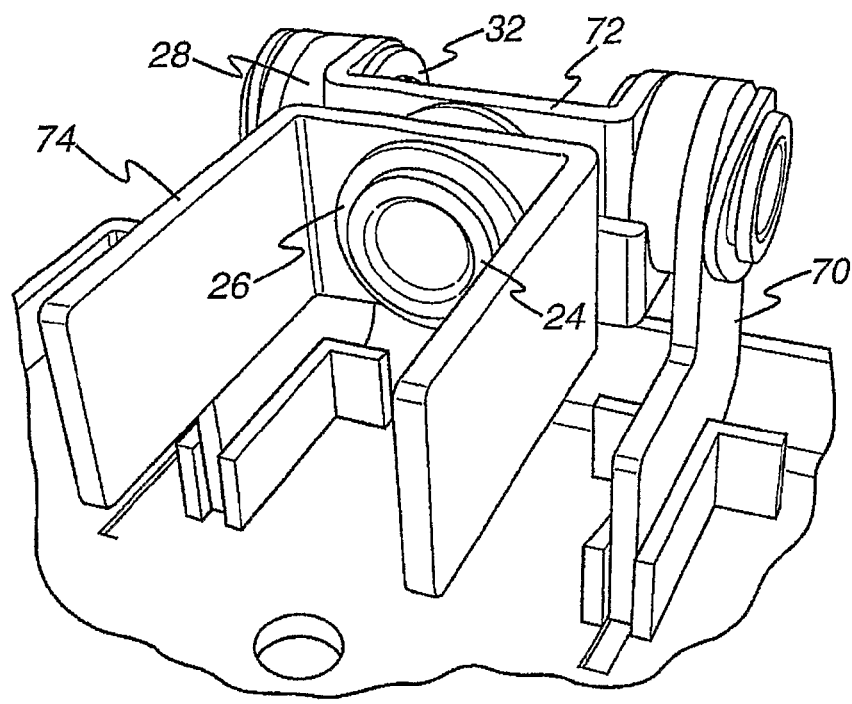
FIG. 10 shows a partial cutaway view of the embodiment shown in FIG. 9 comprising a number of hinge elements as shown in FIG. 4.

FIG. 10 shows a partial cutaway view of the embodiment shown in FIG. 9. This hinge module comprises two covers, three bosses, one C-shaped bracket 72, three C-clips, two L-shaped arms 70, three springs, one U-shaped bracket 74 and three washers. The parts are arranged into three hinge elements as previously described and shown in FIG. 4, the three hinge elements being connected together via the C-shaped bracket. The C-shaped bracket comprises a cross-piece and two lobes, each lobe and the cross-piece having a circular cut away portion for mounting the bracket on an outer surface of a boss.

The two hinge elements mounted on the lobes of the C-shaped bracket form a pair sharing a common axis of rotation which is parallel to the cross-piece. The third hinge element is mounted to the cross-piece of the C-shaped bracket and a cross-piece of the U-shaped bracket thereby linking the C-shaped bracket and the U-shaped bracket. The third hinge element has an axis of rotation which is perpendicular to the rotational axis of the other two hinge elements. This arrangement allows the two body parts to be rotated around the two rotational axes so as to both flip and twist.

Figure 11:
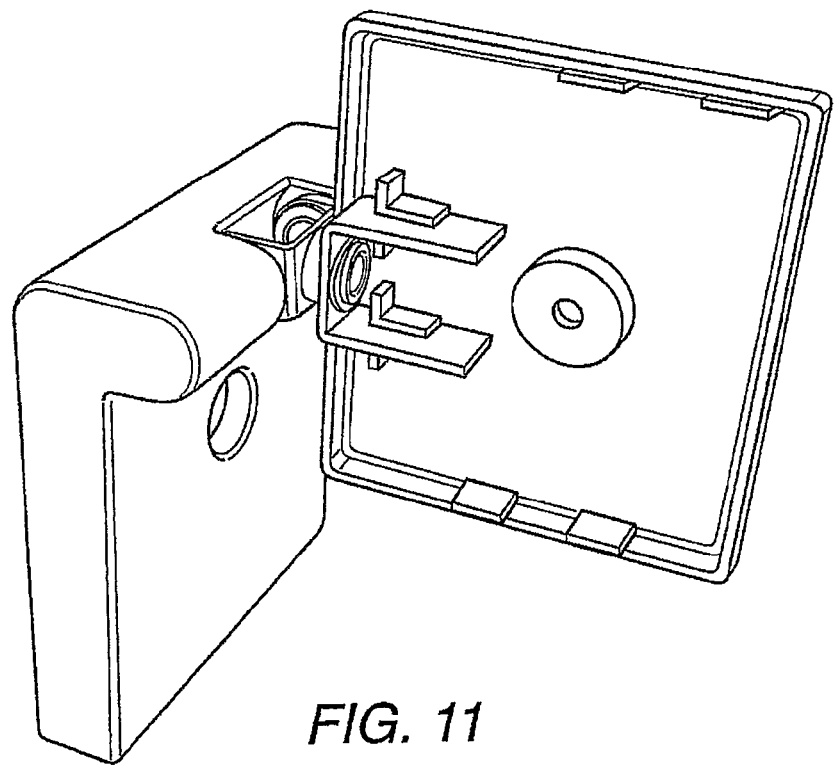
FIG. 11 shows the embodiment of FIGS. 9 and 10, with two body parts arranged at an angle of 90° horizontal and 90° vertical relative to each other.

In the arrangement shown in FIGS. 9 and 10, the two body parts are in the closed position opposing each other. FIG. 11 shows the embodiment of FIGS. 9 and 10, with the two body parts arranged at an angle of 90° horizontal and 90° vertical relative to each other. The first body portion and covers of the hinge module can unfold relative to the L-shaped covers of the second body portion, with fixed angles of 90 and 150°. When the first body portion and the hinge module covers are unfolded relative to the L-shaped body portion, the first body portion is at a fixed angle to the hinge module covers, but when open, the first body portion can rotate by 270° relative to the hinge module covers and the L-shaped body portion (90° in one direction, 180° in the other) with free-stop positioning between end stops.

As in the previous embodiment, the hinge module should be of a size such that the cable holes should be maintained at, for example, at least 4 mm diameter (larger if preferred). The completed hinge assembly should fit into the pair of covers with a maximum 10 mm dimension of the outer surfaces (i.e. enabling a 20 mm folding product). In general, the dimensions of the assembly should be kept as small as possible and the weight as light as possible.

Figure 12:
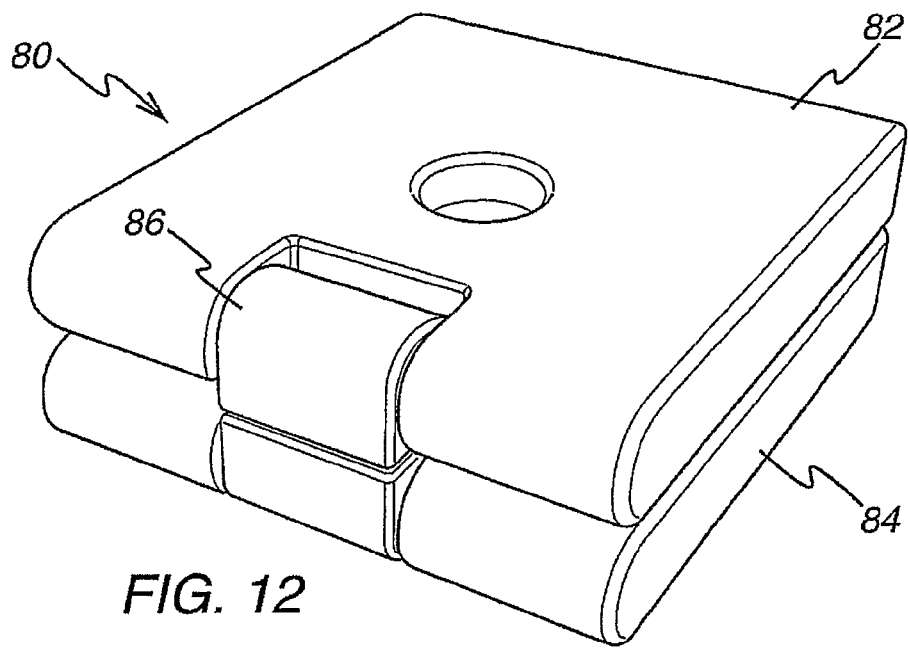
FIG. 12 shows a product according to a third embodiment of the present invention.

FIG. 12 shows a third embodiment of a product 80 according to the present invention which can undergo a flip, twist and sidewind motion as illustrated in FIGS. 1 to 3. The product comprises a first body portion 82 comprising two covers, a second body portion 84 comprising two covers, and a hinge module 86 connecting the first and second portions. Four covers are provided for housing the complete hinge module to prevent dust and other debris getting into the mechanism.

Figure 13:
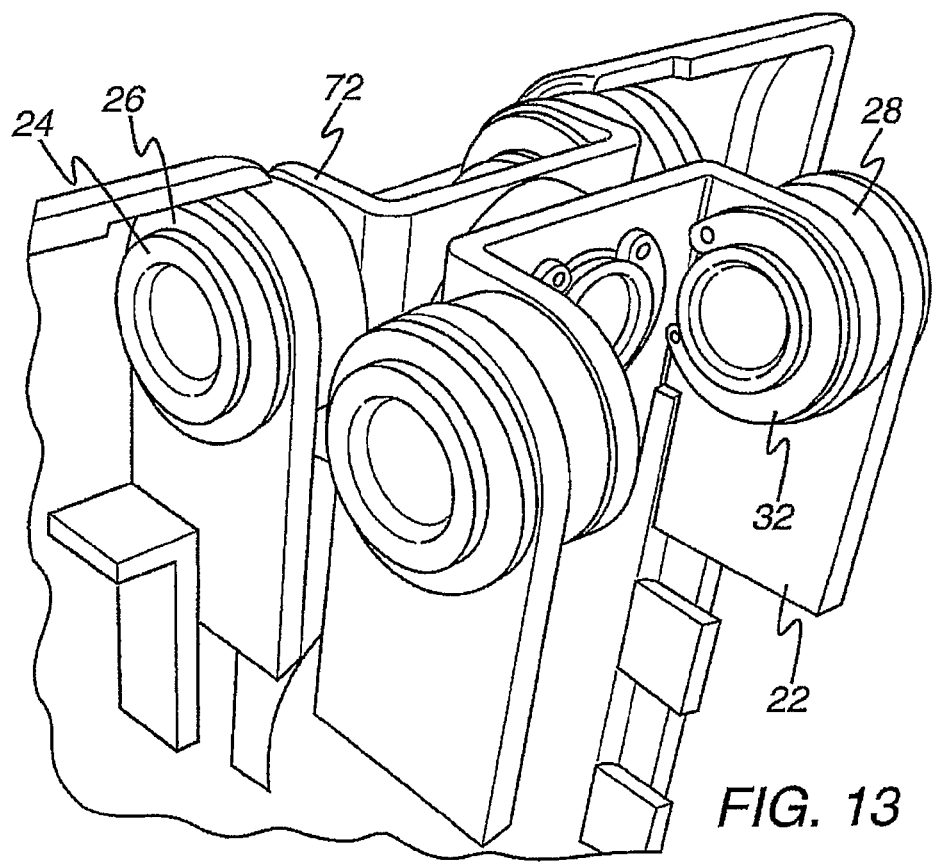
FIG. 13 shows a partially cutaway view of the embodiment shown in FIG. 11 comprising a number of hinge elements as shown in FIG. 4.

FIG. 13 shows a partially cutaway view of the embodiment shown in FIG. 11 comprising a number of hinge elements as shown in FIG. 4. This hinge module comprises four arms, five bosses, two c-brackets, five c-clips, five springs and five washers. The parts are arranged into five hinge elements as previously described and shown in FIG. 4, the five hinge elements being connected together via two C-brackets. The C-brackets each comprise a cross-piece and two lobes, each lobe and each cross-piece having a circular cut away portion for mounting each of the brackets on an outer surface of a boss. The C-brackets are interconnected by one of the bosses which is mounted to both of the cross-pieces with the cross-pieces parallel to each other. The four hinge elements mounted to the lobes of the C-shaped brackets form two pairs, each pair sharing a common rotational axis disposed either side of the pair of cross-pieces and parallel to the cross-pieces.

The hinge element linking the two C-shaped brackets has a rotational axis perpendicular to the other two rotational axes.

The hinge module is symmetrical about a plane extending between the cross-pieces of the two C-shaped brackets. The product can transform about three-rotation axis. Each main body part has three fixed positions relative to its C-shaped bracket (0, 90 and 180°). The two C-shaped brackets can rotate 270° relative to each other (90° in one direction and 180° in the other) with free stop positioning between end stops.

Figure 14:
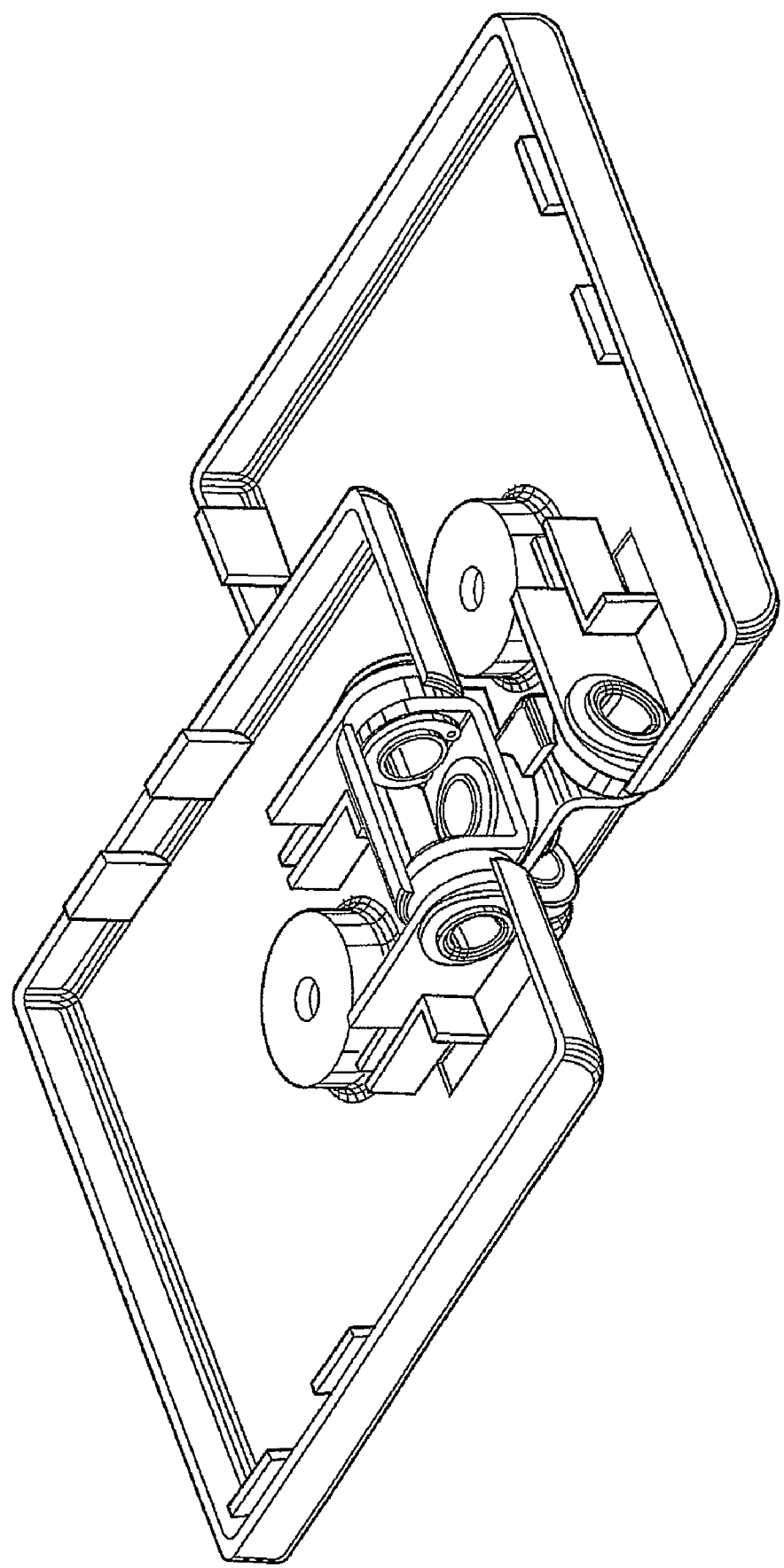
FIG. 14 shows a further view of the embodiment shown in FIGS. 12 and 13.
Figure 15:
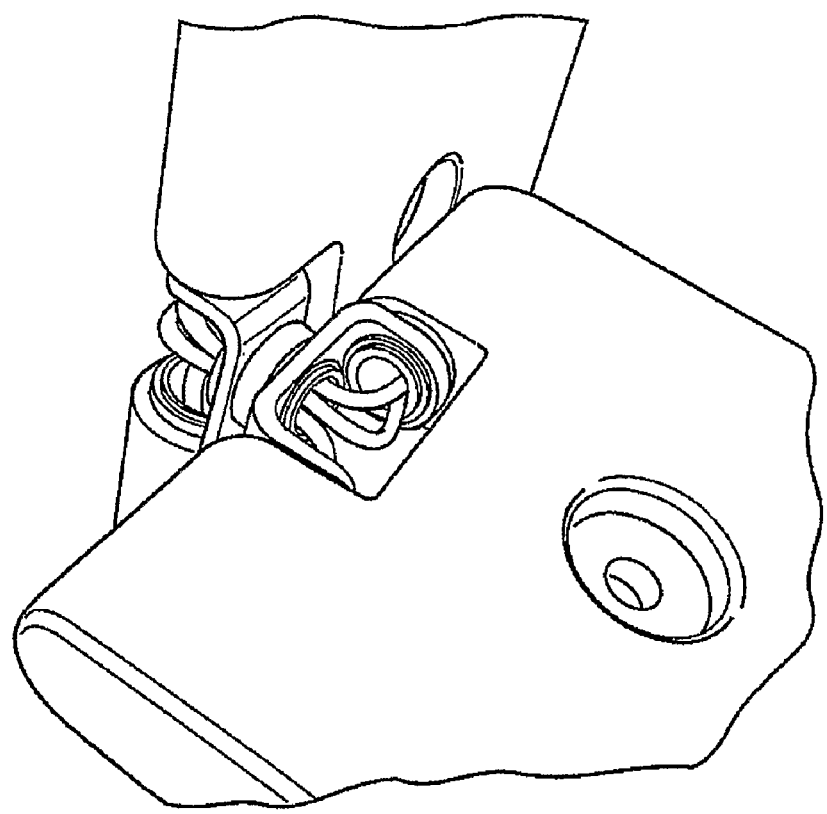
FIG. 15 to 18 show various views of embodiments of hinge modules with connecting wires passing through the hinge module.
Figure 16:
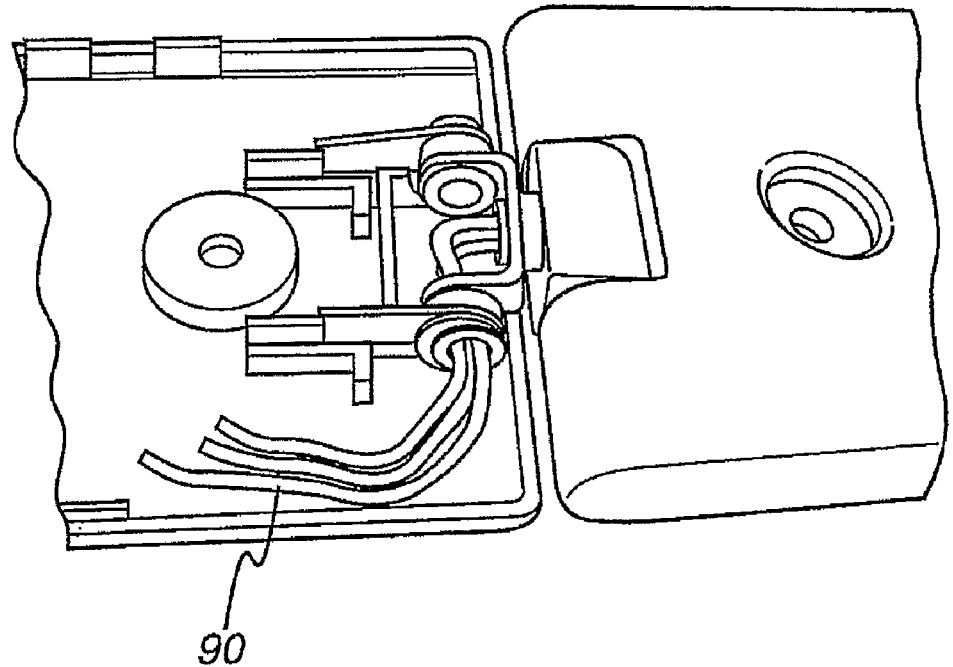
Figure 17:
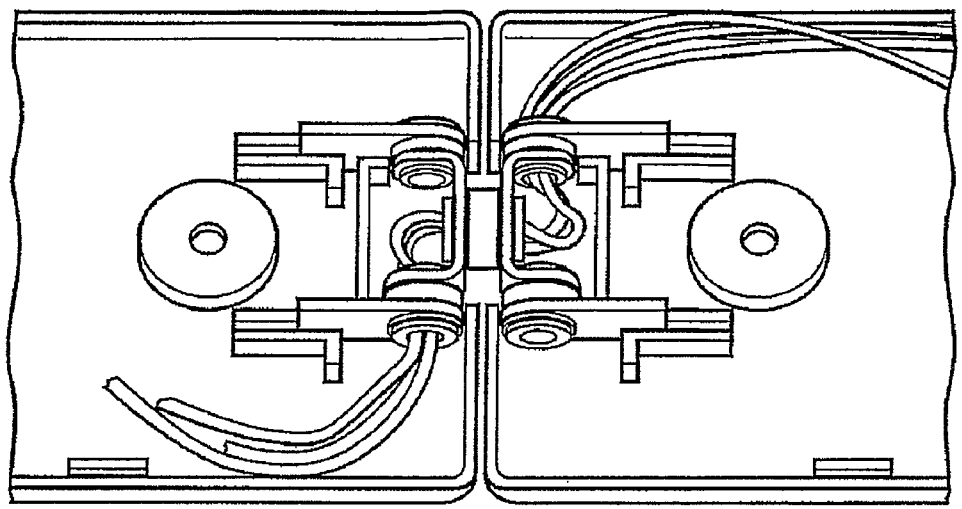
Figure 18:
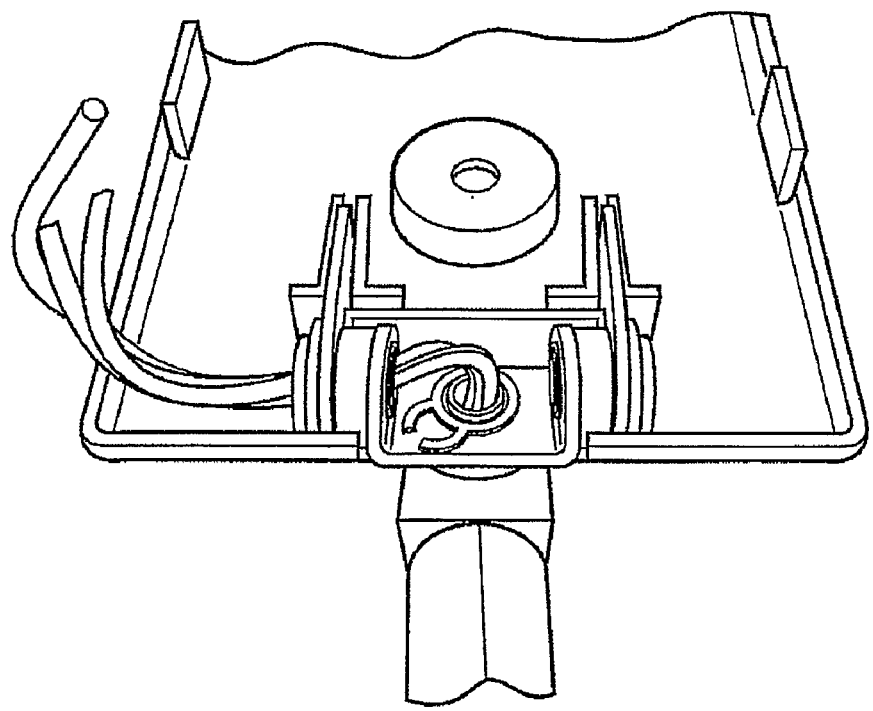

FIG. 14 shows a further view of the embodiment shown in FIGS. 12 and 13. In this arrangement the two body parts have been flipped around a first axis through 180° and sidewound through 90°. The body parts can under go a further flip from this configuration around a second axis which is perpendicular to the first axis.

FIG. 15 to 18 show various views of embodiments of hinge modules with connecting wires 90 passing through the hinge module. In the manufacturing process, hinges can be supplied with the wires pre-fitted, ready to be dropped into products and connected. Also, the electrical connections are provided through the interior of the rotational hinge axis/axes in the hinge devices rather than external as in prior art devices. This is in contrast to prior art production methods in which the electrical interconnections are made by winding the wires and/or flexes around the shafts on the final assembly line which is not production friendly.

Embodiment of the present invention may be applied to a mobile phone. Alternatively, embodiments of the present invention may be applied to other small handheld electronic devices such as calculators, mobile gaming devices, handheld video recorders, electric notepads, electronic books, PDAs, personal stereos, Dictaphones, etc. . . . . .

While this invention has been particularly shown and described with reference to preferred embodiments thereof, it will be understood by those skilled in the art that various changes in form and details may be made therein without departing from the scope of the invention as defined by the appended claims.

The invention claimed is:

1. A modular hinge assembly, comprising:
a bracket;
two hinge elements, each hinge element comprising an arm and a boss defining a through hole, at least one of which is configured for receiving wiring for electrically connecting first and second parts of a handheld electronic device, wherein said arm is rotatably mounted on said boss, and wherein the hinge elements are pivotally connected to the bracket; and
a third hinge element comprising a boss defining a through hole;
wherein the bracket comprises a C-shaped bracket which connects the three hinge elements together in the hinge module, wherein the two of the hinge elements share a first axis of rotation and the axis of rotation of the third hinge element is perpendicular to the first axis of rotation;
wherein the C-shaped bracket comprises a cross-piece and two lobes, each lobe and the cross-piece having a circular cut out portion for mounting on a respective one of the three bosses with the two bosses mounted on the lobes of the C-shaped bracket forming a pair sharing the first axis of rotation;

wherein the modular hinge comprising a further bracket, said further bracket being mounted to the third boss which does not share the first axis of rotation, thereby linking the C-shaped bracket and the further bracket;

wherein the further bracket comprises a second C-shaped bracket having a cross-piece and two lobes, each lobe and the cross-piece having a circular cut away portion for mounting the further bracket on three bosses with two of the bosses mounted on the lobes of the C-shaped bracket forming a pair sharing a common axis of rotation and the third boss being common with the third boss mounted to the first C-shaped bracket.

2. A modular hinge assembly according to claim 1, wherein each said through hole is 4 mm or larger.

3. A modular hinge assembly according to claim 1, wherein the arm of each hinge element has a circular cut out portion through which the boss extends, the circular cut out portion having an inner surface which slidably cooperates with an outer surface of the boss whereby the arm is supported on the boss and is rotatable relative to the boss.

4. A modular hinge assembly according to claim 1, wherein each hinge element further comprises an elastic member mounted on the boss for providing an urging force against a side surface of the arm to securely hold the arm on the boss.

5. A modular hinge assembly according to claim 4, wherein the elastic element is a spring.

6. A modular hinge for mechanically connecting first and second parts of a handheld electronic device, said modular hinge comprising:

two hinge elements, each hinge element comprising an arm and a boss defining a through hole for receiving wiring for electrically connecting the first and second parts, said arm being rotatably mounted on said boss, and wherein the hinge elements are connected by a bracket; and a third hinge element comprising a boss and a through hole;

wherein the bracket comprises a C-shaped bracket which connects the three hinge elements together in the hinge module, wherein the two hinge elements share a first axis of rotation and the axis of rotation of the third hinge element is perpendicular to the first axis of rotation;

wherein the C-shaped bracket comprises a cross-piece and two lobes, each lobe and the cross-piece having a circular cut out portion for mounting the bracket on the three bosses with two of the bosses mounted on the lobes of the C-shaped bracket forming a pair sharing the first axis of rotation, the third boss mounted on the cross-piece of the C-shaped bracket and having a second axis of rotation that is perpendicular to the first axis of rotation;

wherein the modular hinge comprises comprising a further bracket, said further bracket being mounted to the third boss, thereby linking the C-shaped bracket and the further bracket; and wherein the further bracket is a second C-shaped bracket having a cross-piece and two lobes.

7. A mobile electronic device comprising:

a first part;

a second part; and a modular hinge mechanically connecting the first and second parts of a mobile electronic device, said modular hinge comprising:

first and second pairs of hinge elements, each hinge element comprising an arm and a boss defining a through hole for receiving wiring for electrically connecting the first and second parts, said arm being rotatably mounted on said boss; and a bracket comprising a cross piece and four lobes, each lobe having a circular cut out portion wherein the circular cut out portions are mounted respectively on outer surfaces of the bosses, wherein the bracket aligns the through holes of the hinge elements of the first pair of hinge elements in a first axis and aligns the through holes of the hinge elements of the second pair of hinge elements in a second axis of rotation, the first and second axes of rotation being parallel with respect to each other; and wherein the wiring passes through the interior of the modular hinge via the through holes between the first part and the second part of the mobile electronic device.

8. A mobile electronic device comprising:

a first part;

a second part; and a modular hinge mechanically connecting the first and second parts of a mobile electronic device, said modular hinge comprising:

a first pair of hinge elements, each hinge element comprising an arm and a boss defining a through hole for receiving wiring for electrically connecting the first and second parts, said arm being rotatably mounted on said boss;

a third hinge element comprising a boss defining a through hole; and a bracket comprising a cross piece and two lobes, each lobe and the cross piece having a circular cut out portion wherein the circular cut out portions are mounted respectively on outer surfaces of the bosses;

wherein the first pair of the hinge elements are mounted on the lobes and the bracket aligns the through holes of the first pair of the hinge elements with a first axis of rotation and the third hinge element is mounted on the cross piece and the bracket aligns the through hole of the third hinge with a second axis of rotation perpendicular with respect to the first axis of rotation, and wherein the wiring passes through the interior of the modular hinge via the through holes between the first part and the second part of the mobile electronic device.

\* \* \* \* \*

UNITED STATES PATENT AND TRADEMARK OFFICE
CERTIFICATE OF CORRECTION

PATENT NO. : 7,966,698 B2
APPLICATION NO. : 10/584001
DATED : June 28, 2011
INVENTOR(S) : Barnett Page 1 of 1

It is certified that error appears in the above-identified patent and that said Letters Patent is hereby corrected as shown below:

Column 9,

Line 52, after "comprises", cancel "comprising".

Signed and Sealed this
Twenty-fifth Day of September, 2012

David J. Kappos
*Director of the United States Patent and Trademark Office*